3,470,145
COPOLYMERS OF ALPHA MONO-OLEFINS
AND TERPENES
Roger D. A. Lipman, Yonkers, N.Y., assignor to Geigy
Chemical Corporation, Ardsley, N.Y., a corporation of
New York
No Drawing. Filed Mar. 8, 1967, Ser. No. 621,416
Int. Cl. C08f 19/00, 33/08
U.S. Cl. 260—897                                      5 Claims

ABSTRACT OF THE DISCLOSURE

Copolymers of alpha mono-olefins and terpenes useful as rubber tackifiers and in adhesives, are made using Friedel-Crafts or Ziegler type catalysts.

---

This invention relates to copolymers of terpenes and higher alpha mono-olefins and to methods for their production. More particularly, this invention relates to novel compositions of matter prepared by the copolymerization of terpenes, such as beta-pinene, and $C_{10}$–$C_{18}$ alpha mono-olefins, to methods for their preparation and to their use as tackifier components in synthetic rubber, adhesives and the like.

Poly-terpenes, such as poly-beta-pinene, are known and have been used as tackifying components of adhesives and rubber. See, for example, U.S. Patent 2,340,955, issued on February 8, 1944, in the name of L. M. Geiger. Polymers derived from $C_{10}$–$C_{18}$ alpha mono-olefins are also known; they have not been employed as tackifying components for rubber or adhesives and, as will be shown hereinafter, are ineffectual as tackifier components for synthetic rubber.

Copolymers of terpenes with bicyclo heptadiene are known and are useful in adhesive preparations and blends of various resins, including vinyl resins with terpenes are known. However, so far as we are aware, the concept of copolymerizing alpha mono-olefins of comparatively high molecular weight with terpenes has never been attempted and the fact that such copolymers can be synthesized to form useful tackifiers for synthetic rubbers and adhesives is surprising indeed.

The present invention therefore provides a new class of chemical compounds comprising copolymers of terpenes and alpha mono-olefins, specifically alpha mono-olefins having at least 11 and not more than 18 carbon atoms. In particular, the invention envisions copolymers of beta-pinene and olefins of the class described, said copolymers having the general structure

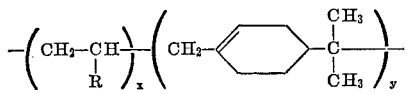

wherein R is an alkyl radical of 9 to 16 carbon atoms and $x$ and $y$ are positive numbers of from 7 to 560 and 1 to 700, respectively.

The invention further envisions synthetic rubbers, and particularly synthetic rubbers based on ethylene-propylene copolymers with or without additional monomeric components containing in quantities sufficient to impart tack thereto, a copolymer of a terpene and an alpha-mono-olefin having 11 to 18 carbon atoms.

The invention further envisions adhesive compositions comprising, in tack producing proportions, a terpene-olefin copolymer of the type described.

The present invention resides in the discoveries that copolymers of terpenes and higher alpha mono-olefin are unexpectedly superior tackifying components for synthetic rubber or adhesives, and that the tackifying effectiveness of the copolymers increases as the alpha mono-olefin proportion increases from about 10 to 35 mole percent. These products are useful for blending with rubber to incorporate building tack necessary for tire production. They are also useful in or as adhesives, particularly in pressure-sensitive adhesives.

The terpene monomer component of the present compositions may be one or more selected from unsaturated $C_{10}$ terpenes. The preferred terpene monomer is beta-pinene.

Other terpenes which can be used include α-pinene, limonenes, dipentene, camphene, myrcene, ocimene, α-fenchene, β-fenchene and the like.

The alpha mono-olefins useful in the copolymers of the invention are those having from about 11 to about 18 carbon atoms, i.e., olefins having the formula

wherein R is alkyl, straight or branched, of about 9 to about 16 carbon atoms. Olefins of this type are conventionally sold as mixtures of olefins having different chain lengths such as $C_{11}$–$C_{14}$ olefins and the like. Such mixtures are perfectly satisfactory for use in the invention.

In the copolymers of the invention, the ratio of terpene to alpha mono-olefins may vary over comparatively wide limits. Normally, however, on a molar basis, it will be from about 0.05:1 to about 20:1 preferably 0.33:1 to about 9:1.

In preparing the copolymers, Friedel-Crafts catalysts such as, for example, boron trifluoride, aluminum trichloride or aluminum tribromide may be employed. Preferably, however, Ziegler type catalysts are used.

As is well known, Ziegler catalysts are prepared from two components, the first of which is an organo-metallic compound or a metal hydride in which the metal is chosen from Groups I to III of the Periodic Chart of the Elements.[1] Examples of such compounds are tri-ethyl aluminum, tri-isobutyl aluminum, tri-n-propyl aluminum, di-ethyl aluminum chloride, diethyl aluminum hydride, di-ethylberyllium, phenyl lithium, and lithium hydride. The preferred compounds are tri-isobutyl aluminum and tri-ethyl aluminum.

The second component of the Ziegler catalyst is a compound of a metal of Groups IV-B to VI-B and VIII of the Periodic Chart of the Elements, preferably a compound of a metal of Groups IV-B or V-B. Halides or oxyhalides are advantageously employed. Examples of suitable compounds include vanadium tetrachloride, vanadium trichloride, vanadyl trichloride, titanium tetrachloride, titanium trichloride, titanium tetrafluoride and tungsten hexachloride. Titanium tetrachloride is generally preferred.

The molecular ratio of the organo-metallic compound (the first component) to the metal compound (the second component) in the Ziegler catalyst may vary widely, from say 0.1 to 10 or more. The ratio is not critical, but for economy, ratios of say 1 to 5 are preferred.

The proportion of catalyst to monomer is again not a critical factor. Indeed since the role of the composition in question is that of a catalyst or initiator, any proportion can be used, though, of course, excessively small proportions will give low conversions and to use excessive amounts is wasteful. Usually 0.0001 to 0.01 mols of catalyst, per mol of olefin used, based on the organo-metallic (first) component, in the case of a Ziegler catalyst.

Ziegler catalysts can be made more active by pre-treating them with an alpha mono-olefin having 4 to 20 carbon atoms, such as, for example, as octene-1, prior to the

---

[1] The version set out at pp. 448–49 of the Handbook of Chemistry and Physics, 4rd edition, 1961–2, published by the Chemical Rubber Publishing Co. is referred to.

copolymerization process. Such preactivation is normally carried out at 25 to 60° C. in the absence of air, for say 4 to 10 hours.

In making the copolymers according to the invention, the mixture of monomers, the catalyst components and an inert organic solvent such as cyclohexane, n-heptane, and benzene, or a similar alicyclic, aliphatic or aromatic solvent, are fed to a suitable reaction vessel, usually a pressure vessel, in the absence of air. The terpene is preferably purified prior to use by distillation from sodium metal under vacuum. The catalyst components are normally fed to the reaction vessel as a slurry in the solvent.

Reaction conditions will vary widely. The reaction is conveniently carried out at room temperature but temperatures from say 0 to 80° C. may be used. Similarly, atmospheric or substantially atmospheric pressure may be used or limited pressures up to say 100 p.s.i.g. may be employed if desired. The reaction time, of course, will depend to some extent on the conversion desired, as well as on the other reaction conditions, but will usually range from say 3 to 80 hours.

After the reaction is completed, the catalyst is killed with methanol or the like and separated from the polymer-solvent mixture. The polymer is obtained as semi-solid material.

It has been noted that one of the chief uses for the polymer in question is as a tackifier for synthetic rubbers. Building tack, that is the ability of rubber to stick or to cohere to itself, is an inherent property of masticated natural rubber and polyisoprene, but most synthetic rubbers lack sufficient tack for use in an unmodified form in tires and the like. In such applications, building tack is important since the rubber product is built by adhering layers of the rubber. Particularly, the present copolymers of terpenes and higher alpha-mono-olefins have been found suitable for use as tackifying components in synthetic rubbers based on ethylene-propylene copolymers, in particular ethylene-propylene/diolefin-modified (EPDM) synthetic rubbers. Heretofore EPDM synthetic rubber has not been used extensively in the tire industry because of a lack of an effective tackifying component. The products of the present invention are also suitable for use as tackifying components in other synthetic rubbers, such as styrene-butadiene rubber (SBR), butyl rubber (IIR), and ethylene-propylene rubber (EPR).

For tackifying purposes, between about 3 and about 15%, based on the weight of the rubber, of the present copolymers are added to the synthetic rubber. Addition is normally carried out in a Banbury or any other conventional blending device.

The terpene, alpha mono-olefins copolymers of the present invention are also useful as adhesive, either alone or combined with other adhesive material, such as rubbery elastomers. The copolymers are particularly useful in pressure-sensitive adhesive compositions. Thus the copolymers may be dissolved in a suitable solvent, such as cyclohexane, and used directly as an adhesive. Suitable elastomers for combination with the present tackifiers include SBR rubber, IIR rubber, and nitrile rubber (NBR). It is, of course, possible, by selecting proper elastomeric materials and compositions, to have adhesive products of a wide range of cohesive and adhesive properties. Thus, the adhesives of the present invention comprise a large number of combinations having widely varying adhesive properties. In addition to the copolymer and rubber elastomer components, such adhesives may include small amounts of stabilizers, plasticizers as fillers. Tackifying resins, other than the copolymers of terpenes and alpha mono-olefins may also be added, such as poly-terpene resins, rosin, coumarone-indene resins, petroleum resins, and the like. To obtain the benefits of the novel copolymers adhesive compositions will normally contain them in a proportion of at least 15% by weight. A simple adhesive containing only the copolymer and a solvent will contain not more than about 50% copolymer by weight.

The following specific examples will illustrate the use of the copolymers of the present invention as tackifying components and adhesives.

EXAMPLES 1-5

Five separate copolymers were prepared from beta-pinene and either tetradecene-1 or a commercially available mixture of $C_{11}$–$C_{14}$ alpha mono-olefins (containing approximately equal molar proportions of each of the four components). The polymerization was carried out by charging a slurry of 0.55 ml. $TiCl_4$ and 1.25 ml. aluminum tri-isobutyl in 50 ml. n-heptane to a 200 ml. reaction vessel under a nitrogen atmosphere. The mixture of monomers was then fed to the vessel and polymerization carried out at 25° C. and at approximately one atmosphere pressure.

After the reaction was completed, the catalyst was killed with methanol. Polymer was precipitated and recovered. Further process details appear in Table I.

TABLE I

| Ex. | Alpha-mono-olefins, grams fed | Terpene, grams fed | Terpene: olefin mole ratio in feed | Reaction, time/hrs. | Copolymer, yield/grams |
| --- | --- | --- | --- | --- | --- |
| 1 | $C_{14}$, 9.8 | β-Pinene, 67.5 | 10:1 | 68.7 | 13.3 |
| 2 | $C_{14}$, 4.9 | do | 20:1 | 68.6 | 11.9 |
| 3 | $C_{11}$–$C_{14}$, 17.4 | β-Pinene, 68.0 | 5:1 | 45.0 | 5.9 |
| 4 | $C_{11}$–$C_{14}$, 4.4 | do | 20:1 | 45.0 | 7.1 |
| 5 | $C_{11}$–$C_{14}$, 43.5 | do | 2:1 | 45.1 | 15.8 |

The tackifiers and rubber were combined in a Banbury mixer, the formulations being as follows:

|  | Grams |
| --- | --- |
| EPDM rubber (Nordel 1070)[1] | 100.0 |
| Carbon black (HAF) | 50.0 |
| Circosol 2XH [2] | 25.0 |
| Stearic acid | 1.0 |
| Zinc oxide | 5.0 |
| Sulfur | 1.5 |
| Mercaptobenzothiazole | 0.5 |
| Tetramethylthiuram disulfide | 1.5 |
| Tackifying resin | 10.0 |

[1] Nordel is a copolymer of ethylene, propylene and a non-conjugated diene (1,4-hexadiene).
[2] Circosol 2XH is a mineral oil containing 51% naphthenic oil and 49% aromatic oil manufactured by Sun Oil Company.

For each of the five copolymers, rubber layers were pressed together at two different pressures, and after a given period of time, separated by hand. Each example was run in duplicate. The results were evaluated and are reported in Table II below. In the table, "excellent" means no separation is possible at the interface because the green strength of the rubber is equal to or less than that of the tack; "very good" means the sample largely tears separating only very little at the interface; "good" signifies somewhat more interfacial separation than very good; "poor" indicates separation largely at the interface with little tearing; "sticky" indicates complete interface separation without tearing.

TABLE II

| Polymer of example | 22 lbs. separation after— | | 36 lbs. separation after— | |
|---|---|---|---|---|
| | 1 minute | 5 minutes | 1 minute | 5 minutes |
| 1 | Sticky | Poor-good | Sticky-poor | Poor-good. |
| 1 | Sticky-poor | do | Poor-good | Do. |
| 2 | Sticky | Sticky-poor | Sticky | Do. |
| 2 | do | Poor | do | Do. |
| 3 | Good | Good | Good | Good. |
| 3 | do | Good-excellent | do | Do. |
| 4 | Sticky | Poor | Poor | Do. |
| 4 | do | do | do | Do. |
| 5 | Good | Good | Good-excellent | Excellent. |
| 5 | do | do | Excellent | Do. |

As the results in Table II show, the copolymers of the present invention exhibit substantial tackifying effects when combined with synthetic EPDM rubber. The best results were obtained using copolymers wherein the mole ratio in the monomer feed of terpene to mono olefin was less than 10.1. Thus, surprisingly, the tackifying effectiveness increased as the mono olefin monomer content increased.

I claim:
1. A copolymer of an alpha-mono-olefin containing between about 11 and about 18 carbon atoms per molecule and beta-pinene.
2. The copolymer of claim 1, wherein the alpha mono-olefin contains between about 11 and about 14 carbon atoms per molecule.
3. A copolymer of an alpha-mono-olefin and beta-pinene having the general formula

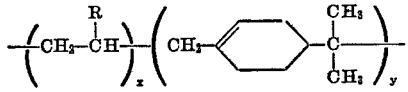

wherein R is an alkyl radical having from 8 to 16 carbon atoms; $x$ is a positive number from about 7 to about 560 and $y$ is a positive number from about 1 to about 700.

4. A rubber composition containing (a) a synthetic ethylene-propylene-diene-modified rubber and (b) a copolymer of an alpha mono-olefin having between about 11 and about 18 carbon atoms per molecule and beta-pinene, said copolymer being present in a proportion sufficient to impart tack to said composition.
5. The rubber composition of claim 4, wherein the alpha mono-olefin contains about 11 and about 14 carbon atoms per molecule.

References Cited
UNITED STATES PATENTS 2,487,898  11/1949  Rummelsburg _____ 260—93.3
3,058,963  10/1962  Vandenberg _____ 260—88.2

FOREIGN PATENTS 6,605,859  10/1966  Netherlands.

MURRAY TILLMAN, Primary Examiner

C. J. SECCURO, Assistant Examiner

U.S. Cl. X.R.

156—334, 338; 260—27, 28, 33.6, 41, 887, 888, 88.2, 93.3